May 15, 1951
W. L. MANNING
2,553,326
APPARATUS FOR SILENCING AND FILTERING
NOISE PRODUCING GASES
Filed Aug. 16, 1946
3 Sheets-Sheet 1
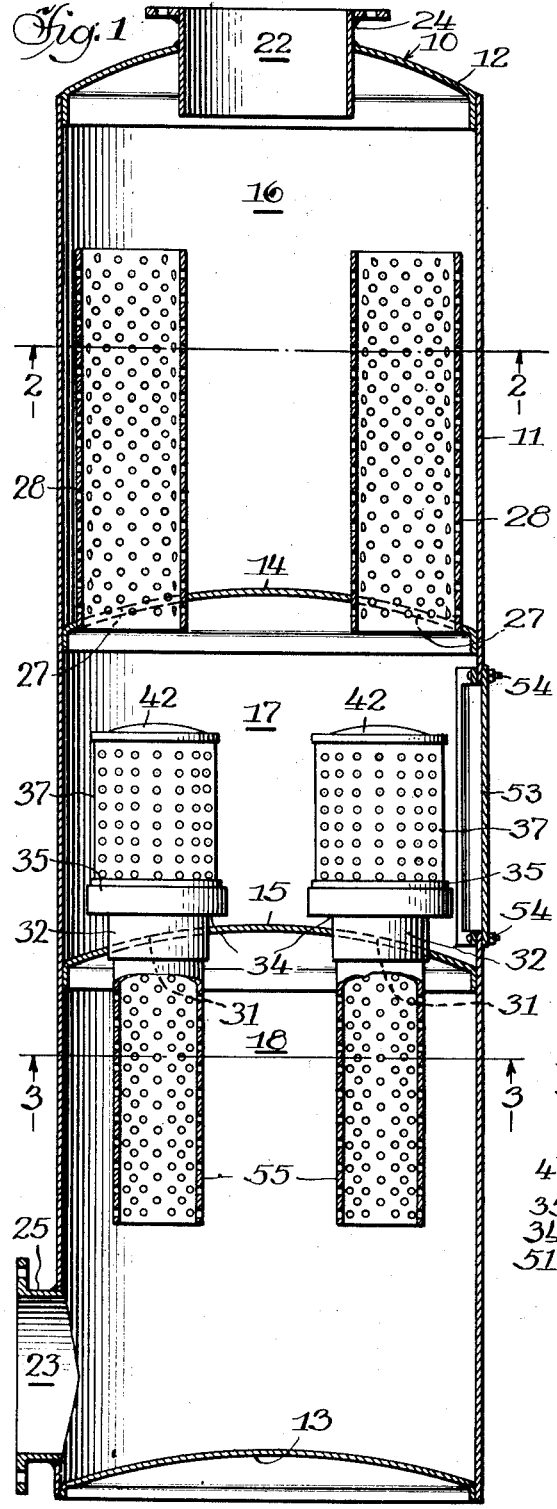
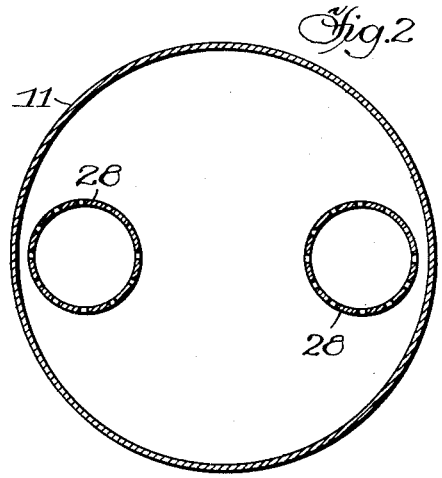
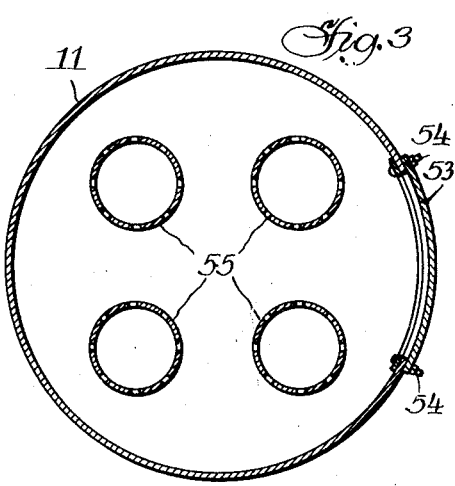
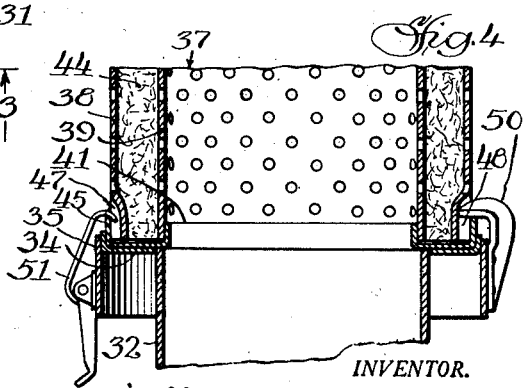
INVENTOR.
Willis L. Manning
BY
Jesch and Darbo
Attys.

May 15, 1951
W. L. MANNING
2,553,326
APPARATUS FOR SILENCING AND FILTERING
NOISE PRODUCING GASES
Filed Aug. 16, 1946
3 Sheets-Sheet 2
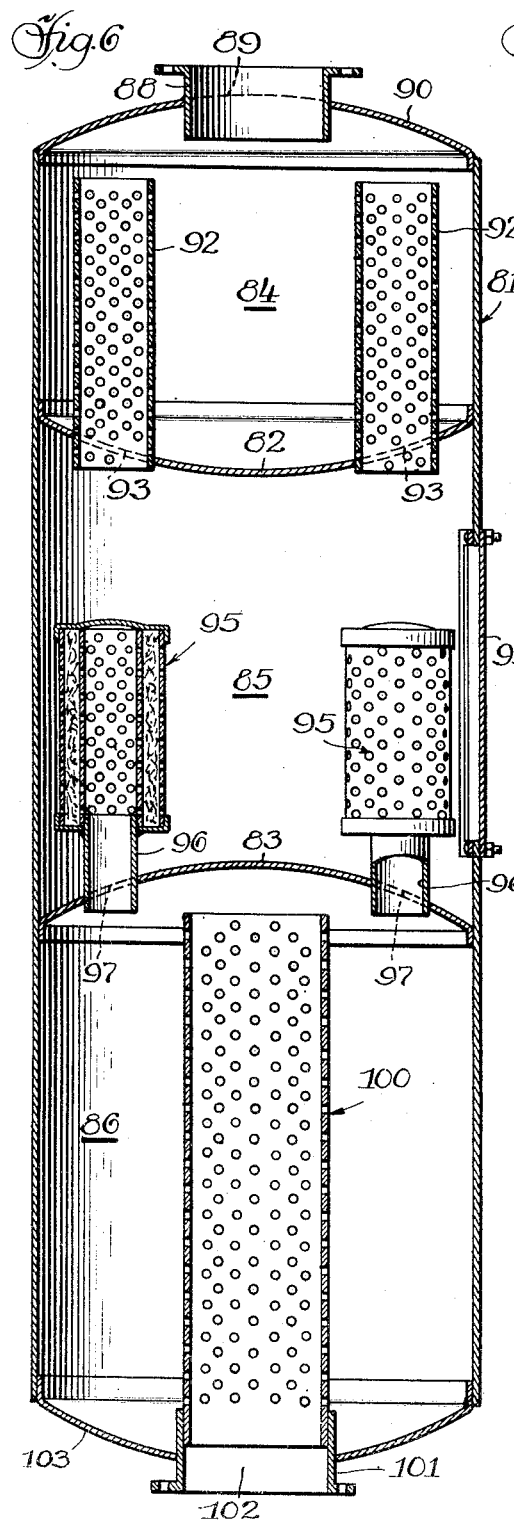
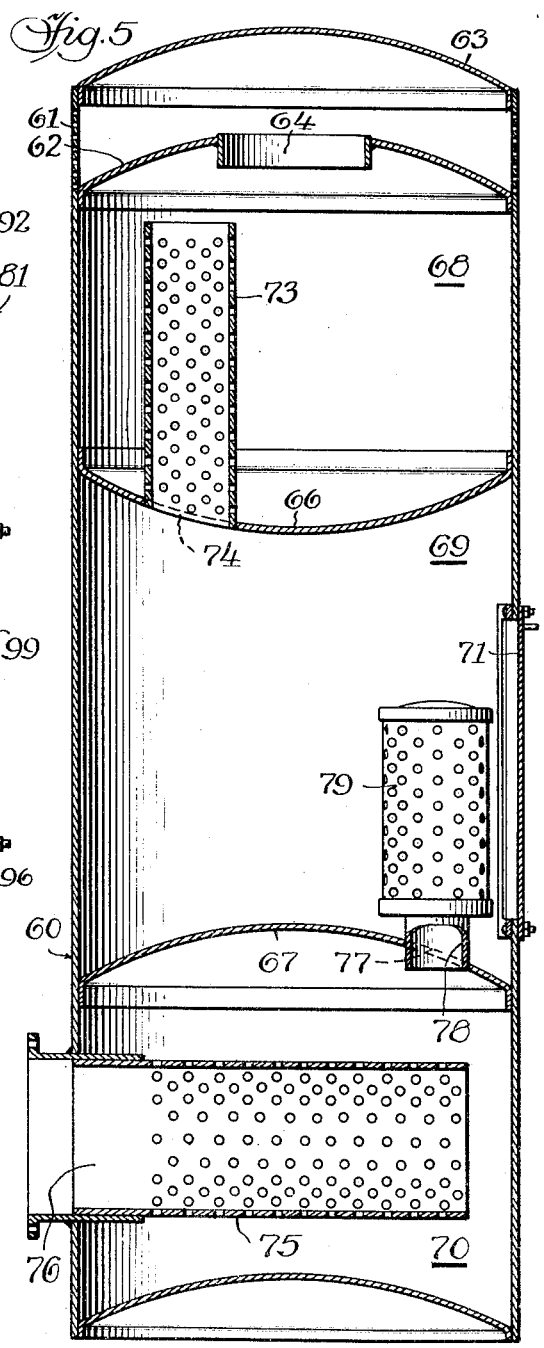
INVENTOR.
Willis L. Manning,
BY
Tesch and Darbo
Attys.

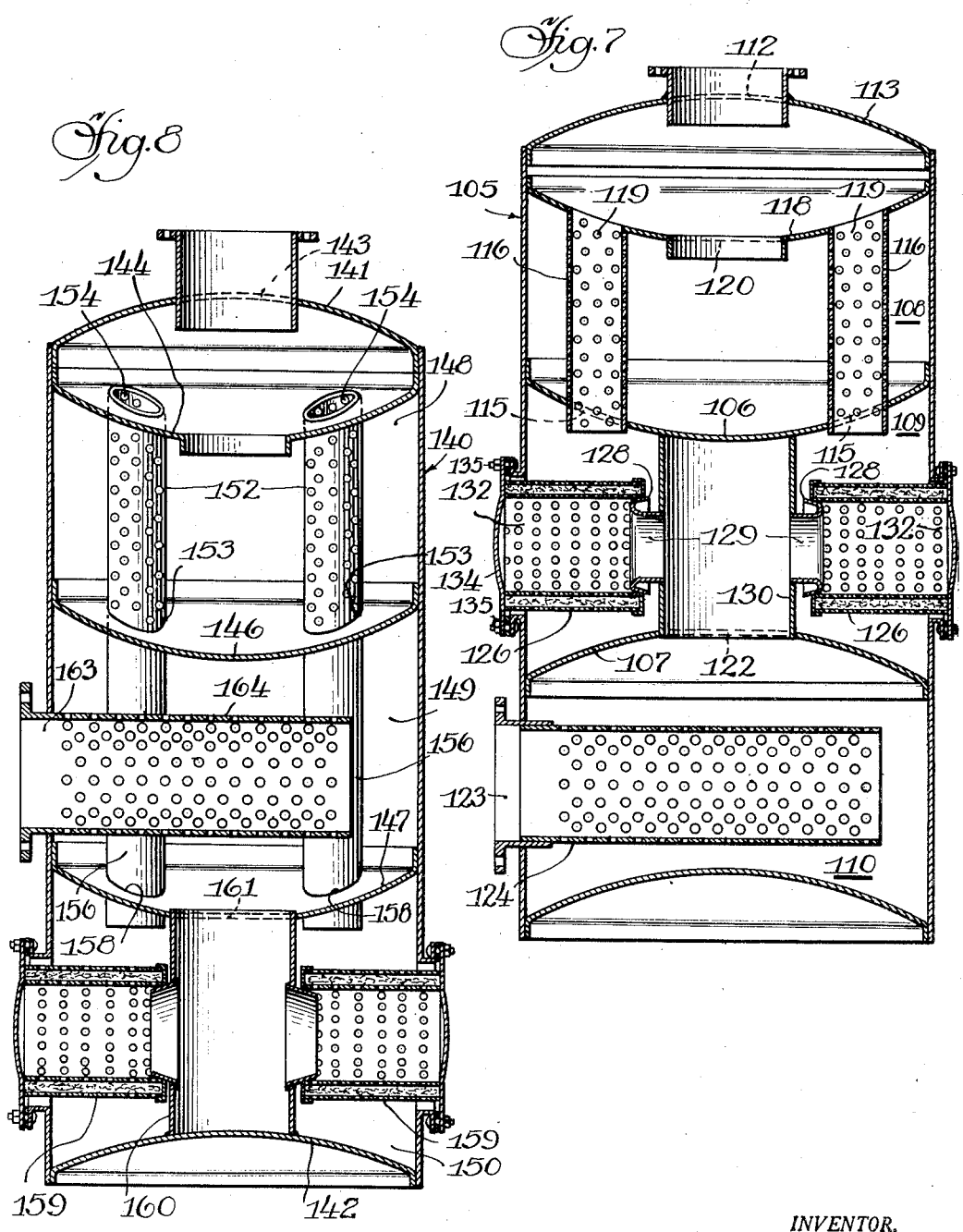

Patented May 15, 1951

2,553,326

UNITED STATES PATENT OFFICE 2,553,326

APPARATUS FOR SILENCING AND FILTERING NOISE PRODUCING GASES

Willis L. Manning, Park Ridge, Ill., assignor to Burgess-Manning Company, Chicago, Ill., a corporation of Illinois Application August 16, 1946, Serial No. 691,068

11 Claims. (Cl. 183—44)

This invention relates to apparatus for silencing the intake noises of internal combustion engines, pumps, blowers, and other apparatus and for filtering the gases going into the intakes. In particular, it relates to improvements in such apparatus in which the silencing and filtering means are combined in an advantageous manner, both functionally and structurally.

It is an object of the invention to provide apparatus of the character described in which the means for silencing the intake noises also assist the filtering means in performing their function.

More specifically, it is an object of the invention to provide silencing means which have the effect of snubbing the pulsations or surges of the gases at the filter in such manner that the gases flow through the filter in a relatively steady stream and the effectiveness of the filter in cleaning the entering gases is materially increased.

In most applications, the gas upon which the apparatus operates is air, but it is not limited to such use, and may be used with other gases as well.

Other objects and advantages will become apparent as the following description progresses, which is to be taken in conjunction with the accompanying drawing, in which:

Fig. 1 is a longitudinal sectional view of one embodiment of the apparatus of the invention;

Figs. 2 and 3 are transverse sectional views along lines 2—2 and 3—3 of Fig. 1, respectively;

Fig. 4 is an enlargement of a portion of the view shown in Fig. 1, showing the mounting for the filters; and Figs. 5, 6, 7 and 8 are longitudinal sectional views of different modifications of the apparatus of the invention.

The apparatus shown in Figs. 1 to 4 consists of a shell 10 having cylindrical side wall 11 and substantially circular end walls 12 and 13. Within the interior of the shell 10 are arranged two spaced apart transverse partitions 14 and 15, which divide the interior of the shell into two snubbing chambers 16 and 18 at the ends of the shell and a filtering chamber 17 between the two snubbing chambers. The end walls and partitions are shown to be dished in shape, but they may be planar, if desired. Unless otherwise stated, the various parts are joined together in a suitable manner, as by welding.

The shell 10 is adapted to be arranged with its longitudinal axis extending vertically and an inlet opening 22 is arranged substantially centrally within the end wall 12 and communicating with snubbing chamber 16, and an outlet opening 23 is arranged in the side wall 11 adjacent to the bottom of the device and communicating with snubbing chamber 18. Flanged imperforate snouts 24 and 25 may be connected to opening 22 and 23 respectively, and are adapted to be connected to conduits (not shown) for the conveyance of the gases. The direction of travel of the gases will herein be considered to be the forward direction.

A plurality of openings 27 are provided in the partition 14 and provide communication between the upper snubbing chamber 16 and the filtering chamber 17. While any desired number of openings may be provided, two are present in the specific arrangement shown, and they are arranged respectively on opposite sides of the center of partition 14. An apertured walled conduit 28 is mounted substantially at one end thereof in each of the openings 27 and extends toward and stops short of the inlet end wall 12. While great latitude is permissible in the number, size and shape of the apertures in conduits 28 and the aggregate area of the said apertures, it is preferred that round openings do not exceed ¼ inch in diameter and that elongated slots do not exceed ¼ inch in width, and that the aggregate area of the apertures in each conduit does not exceed the cross sectional area of the conduit.

A plurality of openings 31 are provided in the partition 15 and provide communication between the filtering chamber 17 and the lower snubbing chamber 18. As many openings 31 as desired may be employed, but in the specific structure shown, four are present and they are arranged between the center and periphery of the partition and are substantially uniformly spaced apart. In the specific structure shown, the openings 31 are in non-alignment with the conduits 28, but if desired, some of the openings 31 may be in alignment with the conduits 28. A relatively short snout 32 is connected to each of the openings 31 and extends into the filtering chamber 17. Upon the end of each snout 32 within chamber 17 is an outwardly extending flange 34, said flange having a rim member 35 encircling the outer edge thereof and extending forwardly and rearwardly therefrom as shown.

Extending rearwardly from each snout 32 is a gas filtering member 37, the forward end of said member resting against the flange 34. The filtering members are of annular shape and consist of spaced apart outer and inner cylindrical retaining members 38 and 39 which are foraminous for the ready passage of gas therethrough and may be composed of screen, perforated sheet metal, or the like. The retaining members 38 and 39 are fixed in their spaced apart relationship at their forward ends by the base ring 41 which is fastened to the end portions of the retaining members and rests against the flange 34. The retaining members are fixed in a similar manner at their rearward ends by an imperforate cap member 42, which is fastened to the rearward end portions of the retaining members. Within the annular space defined by the retaining members 38 and 39, the base ring 41 and cap 42 is arranged a porous gas-pervious body 44 of filtering material, which may be of any suitable construction, such as wavy strand material of fibrous or metallic composition, the gimped strand material described in U. S. Patent 2,122,582 or the knitted strand material described in U. S. Patent 1,676,191, or the like.

The base ring 41 has a forwardly extending flange 45 at the outer edge thereof, and the forward end portion of the outer retaining member 38 is locally bent inwardly upon the opposite sides of the filter to form recesses 47 and 48. A hook member 50 has its base portion rigidly mounted upon the outer surface of the rim 35 and its hook portion extending into the recess 48 and engaging the rearward edge of flange 45. In a similar manner, toggle clamp 51 is mounted rigidly upon the outer surface of rim 35 at a portion thereof opposite to hook 50, and has its clamping end extending into recess 47 and tightly engaging the rearward edge of flange 45.

The filters are adapted to be removed for cleaning, and re-inserted for further service. A removable panel or door 53 is provided in the cylindrical wall 11 to provide access to the filters in filtering chamber 17. The door 53 is removably fastened in place by bolts 54 as shown. The filters are installed in position by tilting them slightly so that the flange 45 will pass underneath hook 50, and are then straightened into alignment with the snout 32, and toggle clamp 51 is then fastened over the edge of flange 45 to fasten the filter in place. To remove the filter, the reverse procedure is followed.

In the second snubbing chamber 18, an open ended apertured walled conduit 55 is connected to each snout 32 and extends forwardly therefrom to a point spaced from the lower end wall 13. The size and shape of the apertures in conduits 55 and the total aggregate area are preferably such as is described heretofore in connection with the conduits 28.

In operation, the snout 25 is connected to the inlet opening of the device with which it is to be used, for example, an internal combustion engine, a pump, blower, etc. Air enters by way of the inlet opening 22, passes forwardly through the apparatus, and leaves through the outlet opening 23, from whence it enters the engine, pump, etc.

The induction of air into the engine, etc. is not continuous, but is intermittent and at the intake the movement of the air is in the form of a succession of surges, the velocity and pressure intensity of which varies with the speed of operation and the character of the particular device being used. In the case of a scavenging pump supplying air to the intake of an internal combustion engine, the pulsations are of relatively great violence. Surges traveling in a backward direction are also present, caused by reflection at the engine or other device, and there is rapid backward and forward motion, or oscillating flow, of the surges, involving the actual translational displacement of the air.

When an air filter is attached to the intake of the engine, etc. there is an intermittent rapidly reversing flow of air through the filter as a result of the action described heretofore, and this results in a mechanical disturbance which interferes with the effective operation of the filter, and the efficiency of the filter is reduced materially from that which is realized when the flow of air is steady. The action described also produces considerable noise.

With the apparatus of the present invention, the interference with the efficient operation of the filter is avoided or reduced to the point where it is negligible, and the noises are effectively quieted. The high pressure surge traveling forwardly from the inlet opening 22 toward the filters 37 expands into the entire volume of the snubbing chamber 16. From the interior of chamber 16 the pressure surge of air diffuses through the apertures of the conduits 28 and into said conduits, and thence into the filtering chamber 17. In passing through the apertures, the peak portion of the surge encounters a severe restriction while the remainder encounters a mild restriction. Such restriction serves to hold the pressure surge in the chamber 16 momentarily while expansion throughout the volume of the chamber takes place and results in a substantial reduction of the pressure. The net result is a checking or snubbing effect upon the surge, which is quite effective in suppressing the pulsations and producing a smooth flow of air. In the absence of the snubbing construction in the chamber, a condition of alternating pressure is set up, in which the pressure alternates between compression and rarefaction, while with the snubbing construction there is the single incoming pressure surge, followed by a relatively gradual reduction of pressure.

In the filtering chamber 17, the air passes laterally through the retaining members 38 and 39 and the filtering body 44 of each filter and into the interior of the filters and thence through the openings 31 and into the chamber 18. The dust and dirt particles are removed from the air by the filtering body 44. After leaving the filters 37, the air passes into the conduits 55 and through the apertures and open ends of said conduits into chamber 18, from whence it passes through opening 23 and snout 25 into the engine, etc.

The effect upon the pulsations traveling backwardly from the outlet opening 23 toward the filters is similar to that described. They expand into the volume of snubbing chamber 18 and undergo a restraint in passing into apertured conduits 55, with the result that a snubbing effect is exerted and the pulsations are suppressed and relatively little air passes backwardly through the filters. In the absence of the snubbing construction, such surges rush violently, or "snap," through the filters in a backward direction and interfere with their effective operation.

The resultant flow of air is forwardly to the engine, and the net result accomplished by the construction of the invention is a quieting of the intake noises and a relatively smooth flow of air forwardly through the filters, with maximum filtering effectiveness.

The action occurring in the system is believed to be as described above. In any event, it has been found that with the arrangement described, in which the filters are located in an intermediate chamber between two snubbing chambers, although a backward and forward vibration of pulsations takes place in the system, the flow at the filters is relatively steady. A condition exists which is analogous to that which would exist in an electrical system if a device, analogous to the filters, were protected by separate damping members, arranged on opposite sides of the device and so constructed that each damps out a different half of the complete current cycle.

As a result, the filtering action takes place with the maximum effectiveness, and none of the difficulties are experienced which have been mentioned heretofore. In addition, from the structural standpoint, the apparatus provides a simple, convenient and economical combination of snubber and filter.

The apparatus shown in Fig. 5 is along lines similar to that shown in Figs. 1 to 4, and consists of a cylindrical shell 60, which is adapted to be arranged with its longitudinal axis extending vertically. The shell has the upper portion 61 of its cylindrical wall perforated, or composed of a screen material, to provide a preliminary screening of the entering air, and has a partition 62 spaced interiorly from the top wall 63, the partition 62 having a substantially central inlet opening 64 therein. The top wall 63 serves as a protective covering for opening 64. The shell has two additional partitions 66 and 67 therein dividing the interior thereof into snubbing chambers 68 and 70 and an intermediate filtering chamber 69, which is provided with a removable panel or door 71. A single apertured walled conduit 73 is connected to the opening 74 in partition 66 and extends into the snubbing chamber 68. An outlet opening 76 for the device is provided in the cylindrical wall of the shell 60 in communication with the snubbing chamber 70. An apertured walled conduit 75 is connected to the outlet opening 76 and projects transversely of the shell 60 into the snubbing chamber 70. An opening 77 is provided in partition 67 and a snout 78 is connected to said opening, and a filter 79, similar to the filters described heretofore, is connected to the snout 78 and arranged in the filtering chamber 69.

In the operation of the device of Fig. 5, the forwardly traveling pulsations undergo a snubbing effect in the chamber 68, in the same manner as described heretofore in connection with the device of Figs. 1 to 4. The backwardly traveling pulsations enter the outlet conduit 75 and pass through the apertures and open end thereof into the chamber 70 where they expand into the entire volume of the chamber with the effect that their velocity and pressure intensity is greatly reduced. The embodiment of Figs. 1 to 4, in which the apertured conduits project forwardly from the filters, is somewhat more effective in snubbing the backwardly traveling pulsations than is the device of Fig. 5.

The embodiment illustrated in Fig. 6 consists of a cylindrical shell 81, which is adapted for arrangement with its longitudinal axis extending horizontally. The shell is divided by partitions 82 and 83 into snubbing chambers 84 and 86 and intermediate filtering chamber 85. A flanged snout 88 is connected to the inlet opening 89 in the inlet end wall 90 and communicates with the snubbing chamber 84. A plurality of open ended apertured walled conduits 92 are connected to openings 93 in partition 82 and extend rearwardly into snubbing chamber 84 and stop short of inlet end wall 90. A plurality of filters 95 are arranged in filtering chamber 86 and are connected to snouts 96, which pass through openings 97 in partition 83. A removable panel or door 99 is provided in the wall of shell 81 coinciding with the filtering chamber 85, and the filters 95 are removable through said door 99. An open ended apertured walled outlet conduit 100 is attached to a flanged snout 101 which passes through outlet opening 102 in end wall 103 of the shell 81. The conduit 100 extends rearwardly in chamber 86 and stops short of partition 83. Any number of conduits 92 and filters 95 may be employed as desired, and while the filters are indicated in Fig. 6 as being in alignment with the conduits, they may be in nonalignment, and the latter arrangement is ordinarily preferred.

The operation of the embodiment of Fig. 6 is substantially the same as has been described heretofore in connection with the device of Fig. 5.

The embodiment shown in Fig. 7 consists of a cylindrical shell 105 which is adapted to be arranged with its axis extending vertically and is divided by transverse partitions 106 and 107 into snubbing chambers 108 and 110 and an intermediate filtering chamber 109.

An inlet opening 112 is provided in the top end wall 113, and a plurality of openings 115 are provided in partition 106. An open ended, apertured conduit 116 is connected to each of the openings 115 and extends upwardly into the snubbing chamber 108 and stops short of the top end wall 113. A plate 118 is arranged substantially at the top ends of conduits 116, and has openings 119 therein to which said conduits 116 are connected. The plate 118 has a central opening 120 therein substantially in alignment with the inlet opening 112.

An opening 122 is provided substantially centrally located in partition 107 and serves as the inlet for the second snubbing chamber 110. An outlet opening 123 for said chamber is provided in the side wall of the shell 105 and an open ended apertured conduit 124 is connected at one end to said outlet opening and extends transversely of the axis of the shell 105 into the chamber 110 and stops short of the wall opposite opening 123.

A plurality of filters 126 are arranged in the filtering chamber 109, said filters being generally annular in shape and having their longitudinal axes extending generally radially with respect to the longitudinal axis of the shell 105. The filters 126 are supported at their inner ends upon the flanges 128 which surround the openings 129 in a conduit 130 which is connected at its upper end to an imperforate portion of the partition 106 and at its lower end to the opening 122 in partition 107. The flanges 128 are circular in shape and make a gas tight joint with the ends of the filters. The opposite end portions of the filters extend through openings 132 in the side wall of shell 105 and are exposed upon the exterior of said shell. A flanged snout 133 is connected to each opening 132 and extends exteriorly of the shell 105. An imperforate cap member 134 is attached to the outer end of each filter 126 and has an edge portion projecting laterally with respect to the longitudinal axis of the filter, which edge portion is removably fastened to the cooperating snout 133 by the bolts 135. The filters 126 are removable through the openings 132 by loosening the bolts 135.

The operation of the embodiment shown in Fig. 7 is generally similar to that of the previously described embodiments. The presence of plate 118 in snubbing chamber 108 does not materially change the snubbing action in said section from that which has been described. The arrangement of the filters may render their removal more convenient in certain types of installations.

The embodiment shown in Fig. 8 comprises a cylindrical shell 140 which is adapted to be arranged with its longitudinal axis extending vertically and has top and bottom end walls 141 and 142, the former being provided with an inlet opening 143. A plate 144, similar to plate 118 of the device of Fig. 7, is arranged adjacent to an inlet wall 141, and two transverse partitions 146 and 147 divide the interior of the shell 140 into snubbing chambers 148 and 149 which are adjacent to each other and a filtering chamber 150 which is located lowermost within the shell 140. While the filtering chamber 150 is structurally in the lowermost position, it is intermediate the snubbing chambers 148 and 149 in the path of the air, as will be explained hereinafter.

Open ended perforated conduits 152 extend upwardly into the first snubbing chamber 148 from openings 153 in partition 146 and are connected at their upper ends to openings 154 in the plate 144. Imperforate conduits 156 extend longitudinally through the second snubbing chamber 149 and are connected at their upper ends to openings 153 and thus directly to the lower ends of apertured conduits 152, and are connected at their lower ends to openings 158 in partition 147. Conduits 156, therefore, provide direct communication between the first snubbing chamber 148 and the filtering chamber 150. Filters 159 are arranged in chamber 150 in the same manner as the filters 126 are arranged in filtering chamber 109 of the embodiment of Fig. 7. The supporting member 160 for the inner ends of the filters 159 is in the form of a pipe or conduit, and the upper end thereof is connected to a central opening 161 in the partition 147. The lower end portion of the said conduit 160 is connected to an imperforate portion of the bottom wall 142 of the shell 140 and does not serve as a means for conveying air, but as a means for preventing the air from by-passing the filters 159. An outlet opening 163 for the device is provided in the side wall of the shell 140 and communicates with the snubbing chamber 149. An apertured conduit 164 is connected to said opening and extends in a transverse direction into snubbing chamber 149 and stops short of the opposite wall of said chamber.

In operation, the air enters by way of inlet opening 143 and passes downwardly into the first snubbing chamber 148 where it undergoes a snubbing action as has been described heretofore. Thence it passes into the apertured conduits 152 and thence into the imperforate conduits 156. It passes through said conduits 156 directly into the filtering chamber 150 without spreading or expanding into the snubbing chamber 149. After undergoing a filtering action in the filtering chamber 150, the air passes into the conduit 160 and thence into the chamber 149, where a snubbing action is again undergone. From the chamber 149, the air passes into the apertured conduit 164 and out through the outlet opening 163. In this embodiment, the filters 159 may be removed for cleaning in the same manner as described in connection with the embodiment shown in Fig. 7.

While several embodiments of the invention have been described and illustrated, these are not exhaustive of the forms which the invention may take, and other changes and modifications may be made within the scope of the invention as the same is defined in the appended claims. For example, more than one snubbing chamber may be arranged on each side of the filtering chamber, if that is desired.

What is claimed is:

1. Apparatus for silencing and filtering noise-producing pulsating gases, comprising a cylindrical shell, two transverse partitions in said shell dividing the interior thereof into three chambers comprising two end chambers and an intermediate chamber, said partitions and the end walls of said shell each having at least one opening therein providing inlet and outlet openings for each of said chambers, an open-ended, apertured-walled conduit connected to each of the openings in said partitions and extending from said partitions into the end chambers and stopping short of the walls of said end chambers opposite to said partitions, a plurality of gas filters in said intermediate chamber, said filters being arranged across the path of the gases traversing said intermediate chamber, said shell having an opening therein communicating with said intermediate chamber, said filters being transportable through said last mentioned opening, and a removable closure for said last mentioned opening.

2. Apparatus for silencing and filtering noise-producing pulsating gases, comprising a cylindrical shell, two transverse partitions in said shell dividing the interior thereof into three chambers comprising two end chambers and an intermediate chamber, said partitions and the end walls of said shell each having at least one opening therein providing inlet and outlet openings for each of said chambers, an open-ended, apertured-walled conduit connected to the outlet opening of each of the end chambers in said shell and extending toward and stopping short of the inlet wall of said chamber, a plurality of gas filters in said intermediate chamber, said filters being arranged across the path of the gases traversing said intermediate chamber, said shell having an opening therein communicating with said intermediate chamber, said filters being transportable through said last mentioned opening, and a removable closure for said last mentioned opening.

3. Apparatus for silencing and filtering noise-producing pulsating gases, comprising a cylindrical shell, at least two transverse partitions in said shell dividing the interior thereof into a plurality of chambers, said partitions and the end walls of said shell each having at least one opening therein providing inlet and outlet openings for each of said chambers, an open-ended, apertured-walled conduit connected to each of the openings in said partitions and extending from said partitions into the end chambers and stopping short of the walls of said end chambers opposite to said partitions, a plurality of gas filters in a chamber in said shell intermediate said end chambers, said filters being arranged across the path of the gases traversing said intermediate chamber, said shell having an opening therein communicating with said intermediate chamber, said filters being transportable through said last mentioned opening, and a removable closure for said last mentioned opening.

4. Apparatus for silencing and filtering noise-producing pulsating gases, comprising a cylindrical shell, at least two transverse partitions in said shell dividing the interior thereof into a plurality of chambers, said partitions and the end walls of said shell each having at least one opening therein providing inlet and outlet openings for each of said chambers, an open-ended, apertured-walled conduit connected to the outlet opening of each of the end chambers in said shell and extending toward and stopping short of the opposite wall of said chamber, a plurality of gas filters in a chamber in said shell intermediate said end chambers, said filters being arranged across the path of the gases traversing said intermediate chamber, said shell having an opening therein communicating with said intermediate chamber, said filters being transportable through said last mentioned opening, and a removable closure for said last mentioned opening.

5. Apparatus for silencing and filtering noise-producing pulsating gases, comprising a cylindrical shell, at least two transverse partitions in said shell dividing the interior thereof into a plurality of chambers comprising an intermediate chamber between adjacent chambers, said partitions and the end walls of said shell each having at least one opening therein providing inlet and outlet openings for each of said chambers, the outlet opening of one chamber being connected to the inlet opening of the next chamber whereby said chambers are connected together in series in the path of the gases, at least one gas filter in said intermediate chamber, said filter being arranged across the path of the gases traversing said intermediate chamber, an open-ended, apertured-walled conduit connected to each of the inlet and outlet openings of said intermediate chamber and extending into said adjacent chambers and stopping short of the opposite walls of said adjacent chambers, said shell having an opening therein communicating with said intermediate chamber, said filters being transportable through said last mentioned opening, and a removable closure for said last mentioned opening.

6. Apparatus for silencing and filtering noise-producing pulsating gases, comprising a shell, at least two partitions in said shell dividing the interior thereof into a plurality of chambers, said chambers each having an inlet opening and an outlet opening in the walls thereof and being connected in series for the passage of gas therethrough, an open-ended, apertured-walled conduit connected to each opening in one wall of each of the first and last of said chambers in the path of the gases and extending toward and stopping short of the opposite wall of said chamber, and at least one gas filter in a chamber in said shell intermediate said first and last chambers, said filter being arranged across the path of the gases traversing said intermediate chamber.

7. Apparatus for silencing and filtering noise-producing pulsating gases, comprising a plurality of chambers, said chambers each having an inlet opening and an outlet opening in the walls thereof, the outlet opening of one chamber being connected to the inlet opening of the next chamber in the path of the gases whereby said chambers are connected together in series, an open-ended, apertured-walled conduit connected to the outlet opening of the first and the inlet opening of the last of said chambers in the path of the gases and extending toward and stopping short of the opposite wall of said chamber, and at least one gas filter in one of said chambers intermediate said first and last chambers, said filter being arranged across the path of the gases traversing said intermediate chamber.

8. Apparatus for silencing and filtering noise-producing pulsating gases, comprising a plurality of chambers, said chambers each having a least one inlet opening and at least one outlet opening in the walls thereof, the outlet opening of one chamber being connected to the inlet opening of the next chamber in the path of the gases whereby said chambers are connected together in series, an open-ended, apertured-walled conduit connected to each opening in one wall of each of the first and last of said chambers in the path of the gases and extending toward and stopping short of the opposite wall of said chamber, and at least one gas filter in a chamber in said series intermediate said first and last chambers, said filter being arranged across the path of the gases traversing said intermediate chamber.

9. Apparatus for silencing and filtering noise-producing pulsating gases, comprising a plurality of chambers, said chambers each having at least one inlet opening and at least one outlet opening in the walls thereof, the outlet opening of one chamber being connected to the inlet opening of the next chamber in the path of the gases whereby said chambers are connected together in series, an open-ended, apertured-walled conduit connected to at least one of said openings of each of the first and last of said chambers in the path of the gases and extending toward and stopping short of the opposite wall of said chamber, and at least one gas filter in a chamber in said series intermediate said first and last chambers, said filter being arranged across the path of the gases traversing said intermediate chamber.

10. Apparatus for silencing and filtering noise-producing pulsating gases, comprising a plurality of chambers, said chambers each having at least one inlet opening and at least one outlet opening in the walls thereof, the outlet opening of one chamber being connected to the inlet opening of the next chamber in the path of the gases whereby said chambers are connected together in series, an open-ended, apertured-walled conduit connected to each opening in one wall of each of the first and last of said chambers in the path of the gases and extending toward and stopping short of the opposite wall of said chamber, and gas filtering means in a chamber intermediate said first and last chambers, said filtering means being arranged across the path of the gases traversing said intermediate chamber.

11. Apparatus for silencing and filtering noise-producing pulsating gases, comprising means forming at least three chambers, said chambers each having an inlet opening and an outlet opening therein, the outlet opening of one chamber being connected to the inlet opening of the next chamber in the path of the gases whereby said chambers are connected together in series and one of said chambers is arranged in an intermediate position in said series, gas filtering means in said intermediate chamber and arranged across the path of the gases traversing said intermediate chamber, and means in said chambers on both sides of said intermediate chamber in said series for snubbing the pulsations of said gas.

WILLIS L. MANNING.

REFERENCES CITED

The following references are of record in the file of this patent:

UNITED STATES PATENTS

| Number | Name | Date |
| --- | --- | --- |
| 425,637 | Shipman | Apr. 15, 1890 |
| 2,037,884 | Day | Apr. 21, 1936 |
| 2,050,581 | Orem | Aug. 11, 1936 |
| 2,196,491 | Chipley | Apr. 9, 1940 |
| 2,287,412 | Bourne | June 23, 1942 |